United States Patent
Kuo

[11] Patent Number: 5,295,181
[45] Date of Patent: Mar. 15, 1994

[54] AUTOMATIC FACSIMILE OUTPUT RECIPIENT TELEPHONING SYSTEM

[75] Inventor: Youti Kuo, Penfield, N.Y.

[73] Assignee: Xerox Corporation, Stamford, Conn.

[21] Appl. No.: 933,831

[22] Filed: Aug. 24, 1992

[51] Int. Cl.$^5$ .............................................. H04M 11/00
[52] U.S. Cl. ...................................................... 379/100
[58] Field of Search ............................ 379/93, 96–100, 379/90, 110, 354–356; 358/400, 403, 438, 440, 442, 468, 444

[56] References Cited

U.S. PATENT DOCUMENTS

| T102,102 | 8/1982 | Bolle et al. | 355/14 R |
|---|---|---|---|
| 4,086,443 | 4/1978 | Gorham et al. | 379/100 |
| 4,352,012 | 9/1982 | Verderber et al. | 235/487 |
| 4,414,579 | 11/1983 | Dattilo et al. | 358/256 |
| 4,430,563 | 2/1984 | Harrington | 235/494 |
| 4,437,660 | 3/1984 | Tompkins et al. | 271/290 |
| 4,470,356 | 9/1984 | Davis et al. | 109/24.1 |
| 4,654,718 | 3/1987 | Sueyoshi | 358/257 |
| 4,763,892 | 8/1988 | Tanaka et al. | 271/293 |
| 4,843,434 | 6/1989 | Lawrence et al. | 355/72 |
| 4,893,333 | 1/1990 | Baran et al. | 379/100 |
| 4,947,345 | 8/1990 | Paradise et al. | 364/519 |
| 5,051,779 | 9/1991 | Hikawa | 355/200 |
| 5,060,980 | 10/1991 | Johnson et al. | 283/70 |
| 5,098,074 | 3/1992 | Mandel et al. | 270/53 |
| 5,115,326 | 5/1992 | Burgess et al. | 358/440 |
| 5,126,858 | 6/1992 | Kurogane et al. | 358/400 |
| 5,127,047 | 6/1992 | Bell et al. | 379/100 |
| 5,161,037 | 11/1992 | Saito | 358/468 |

FOREIGN PATENT DOCUMENTS

| 0241273 | 10/1987 | European Pat. Off. | G03G 15/00 |
|---|---|---|---|
| 0354703 | 2/1990 | European Pat. Off. | H04M 1/274 |

Primary Examiner—Wing F. Chan

[57] ABSTRACT

Separating the physical sheets outputted from a shared users printer, especially, a facsimile receiver, into separate job sets for separate designed recipients, and notifying the recipients, with an independent "mailboxing" job sorting accessory unit, not requiring any electronic connection to the printer, controlled solely by physical job cover sheets outputted by the printer at the same output in advance of the other sheets of the job, which cover sheets variably encoded with simply and uncritically marked areas indicative of an assigned bin number and the job sheet count. The unit sequentially takes the printer output sheets and feeds them through a sheet input with optical sensing connecting with a control for detecting the marked area encoding of the cover sheet and determining if it corresponds to an assigned bin number, for feeding the subsequent output sheets of the designated sheet count to a designated bin subsequent to such a detection; and for feeding output sheets to another output sheet collection bin if no such encoding is detected. The disclosed unit also desirably has bin locking for restricting access to individual bins with electrical unlocking of a bin in response to entry of a bin access code. The remote recipient notification is an integral automatic bin recipient messaging (telephoning) of the pre-designated bin-holder with a recorded message telling that bin-holder is receiving or has received a job in his or her designated bin, by automatically dialing telephone numbers preprogrammed and maintained in non-volatile memory for designated bins, so that only the bin number and not the telephone number need be indicated on the controlling cover sheet.

12 Claims, 8 Drawing Sheets

FAX CODED COVER SHEET

Date: _____

TO: _____

TC #: _____

From: _____

TELEPHONE#: _____

INTELNET#: _____

TELECOPIER#: (999-999-6789)

INTELNET#: (8*889-6789)

Number of Pages _____ 15
(including cover sheet)

Bin Number _____ 1

*FIG. 2B*

AUTOMATIC FACSIMILE OUTPUT RECIPIENT TELEPHONING SYSTEM

CROSS REFERENCE TO RELATED APPLICATION

Cross-referenced and incorporated by reference is a related application of even date by the same inventor and assignee entitled, "Facsimile Output Job Sorting Unit and System".

Also cross-referenced is another application by the same assignee, by Robert P. Siegel, entitled "Remote Voice Notification of FAX Transmission Received".

SUMMARY OF THE INVENTION

Disclosed is a job sorting or "mailboxing" and telephoning system, in which sets of plural physical sheet jobs are preceded by physical cover sheets which are coded in a manner which can be optically read by the "mailbox" sorter unit itself to thereby direct that set of sheets into a particular bin, or set of bins, and automatically notify the bin holders of the job receipt. That is, the sorter or "mailbox" unit can obtain information solely from reading a control sheet within a sequence of other commonly inputted sheets (from a physical sheet output source such as a facsimile or other printer) to control a desired storage destination of the accompanying sequence of sheets and a message indicative thereof. This allows plural users to have a shared system which automatically puts different users outputs into different mailboxes or sorter bins, and discretely notifies them of it, without having to go up to or wait by the machine to program it. I.e., printing jobs can be sorted by job senders, users or addressees, and notice of that sent automatically, without normally requiring any operator presence or local keying. It also allows for a sorter module that is universal, in the sense that the sorter module doesn't care where the sheets it receives come from. It can automatically obtain all needed information indicating a job's desired bin destination solely from a physical control sheet handled like any other sheet to send the job sheets to that indicated bin. [As discussed herein, job or addressee "mailboxing" is not "sorting" in the common or usual sense of collating plural identical copy sheets by sequentially placing them in different bins, even if similar hardware may be employed.]

Additionally disclosed is a low cost, easy to use, such system for discretely automatically handling received facsimile or other printer output documents, fully compatible with existing conventional facsimile systems of all types. It can be used as a simple accessory for various existing facsimile receivers. Since there are millions of existing facsimile and other printers, of different manufacturers, it is highly desirable not to require any modifications of those units, and to accommodate their variations in sheet registration and sheet printing magnifications.

In particular, there is further disclosed a facsimile or other printer output sheet sorting system capable of independently handling and separating different jobs for different addressees automatically and simply, without requiring connection to a computer system, complex software, electric image memory storage, or special facsimile operations or procedures. A simple, easily marked, cover sheet (leader sheet or job sheet) for the facsimile transmitted document may be used, which cover sheet is compatible and/or interchangeable with existing facsimile document cover sheets. As further disclosed in the example hereinbelow, a conventionally facsimile received hard copy of such a marked cover sheet of a facsimile transmitted plural page document may be fed into and optically read by a separate multi-bin mailboxing unit to automatically control the particular bin assignment and bin destination of the cover sheet and its accompanying plural page document job sheets.

Further disclosed is a method and apparatus for sorting received facsimile, or other printer, documents wherein a simple, uncritical code pattern located on a transmitted and printed cover sheet for a document is used to designate a particular physical destination for the printed document sheets. More specifically, further disclosed is a method and apparatus for bin coding in which a user bin number and a number of pages associated with a job are marked on a cover sheet before it is transmitted and are read by a code reader in a simple mailbox device at the receiving station.

The disclosed unit can be a universal stand-alone unit that may be attached to, or even simply moved next to, the output of almost any conventional facsimile machine or networked electronic mail printer, or other printer. No electrical or mechanical linkages or interconnections are required. [However, as additionally disclosed in the example below, if desired, a common telephone line can be shared with a facsimile machine for additional features.]

It is important to note that with the present system, the marked cover sheet need not be read by either the input image scanner or the image receiver, the facsimile system or any image printer. Thus, there is no need until after the facsimile transmission has been regularly printed in hard copy to electrically and/or optically separate or distinguish encoded control indicia on the cover sheet from regular text or image data. The latter is required by many other much more complex systems requiring image storage and software manipulation, examples of which are cited below.

As disclosed in the embodiment herein, another disclosed aspect of the present system can be to provide convenient discrete locked bins security for received facsimile hard copies for several different recipients, or shared user printer jobs. That is, also disclosed in the example hereinbelow is electronically controlled bin locking for private bins security. This allows plural shared facsimile or printer recipients to share the same conventional facsimile receiver or other printer without disclosing, compromising or commingling their separate jobs and/or correspondence.

Unlike various prior art systems, no bar coding or other critically finely spaced indicia documents or images which require critical reading and/or discrimination from normal text or image data by the facsimile receiver or a networked computer are required with the disclosed system. Also, no special electrical signals or control codes need to be transmitted.

Unlike some prior facsimile transmitted cover letter marked (encoded) control sheet systems, discussed below, the present system does not require tedious and error prone marking of ten or more separate boxes or other indicia corresponding to all 10 digits of a recipient telephone number and/or name, etc,.

The disclosed system at the facsimile transmission end (transmitter) uses merely a simple non-critical FAX transmittal cover sheet which can be easily repeatedly reproduced and transmitted by customers. It is usable even after several generations of copies, since it is quite insensitive to copying distortion errors, unlike many bar code pattern type systems. The subject cover sheet is usable like, and as, an ordinary facsimile cover sheet.

As shown in the disclosed embodiment here, simple non-critical manual marking in as little as one or two areas of an otherwise conventional facsimile transmittal cover sheet by the sender of any facsimile document can provide job output separated by addressee at the receiving facsimile area with an exemplary disclosed automatic output sorting unit. Only a one or two digit bin number need be encoded for the disclosed system, not an entire telephone number. Facsimile job separation upon receipt can be done simply by placing a couple of dark marks in pen or pencil on a standardized simple code pattern facsimile transmission cover sheet indicating the recipient's bin number. (Also, preferably another two marks for the number of sheets being sent to the designated bin). This disclosed exemplary unit can then automatically place the received facsimile job into a designated or assigned lockable bin, and, in coordination, even place a telephone call to the addressee recipient binholder indicating a facsimile receipt by that binholder.

In other words, the disclosed embodiment provides a stand-alone "mailbox" or addressable sorter which can automatically sort and file conventional facsimile output documents (conventional "hard copies", i.e., physical sheets) in discrete designated bins, which can be secured. Yet, as further disclosed, these locked bins can be easily individually unlocked electrically to provide almost instant access to the secured hard copies. With the disclosed system, recipients do not need to stand by facsimile receivers awaiting confidential facsimile messages to avoid their being read, or even accidentally taken, by other users. [Note that typical facsimile receivers simply commonly stack all received documents for all recipients together into one tray.] This disclosed system allows for confidential facsimile transmissions across the whole facsimile machine population, not limited to any particular machine or product line.

The same shared unit and system further provides automatic telephone notification of facsimile message or other electronic mail arrivals to individual recipients. That is, further disclosed in the example below is an automatic dialer system software relating the indicated bin numbers with storable (retained) user's phone numbers. Thus, the numerous advance or subsequent voice phone calls presently being made to indicate facsimile transmissions can be avoided.

A specific feature of the specific embodiment disclosed herein is to provide an apparatus for a system for separating the outputted plural physical sheet jobs from the output of an electronically shared users document job printer, which printer comprises, but is not limited to, a facsimile receiver printer, into separate job sets for separate designed recipients of documents jobs electronically transmitted to said printer, comprising: a variably encoded physical job cover sheet outputted by said printer at said same output in advance of said outputted sheets of a said printer output job, said job cover sheet being variably encoded with marked areas indicative of a bin number and a job sheet count number for said printer output job; a printer output job sheet sorting and remote recipient notifying accessory unit, said accessory unit including sheet input means positionable at said sheet output of said job printer to sequentially receive said output job sheets therefrom and feed them in a sheet feeding path into said sheet input means; plural discrete job output sheet collection bins; and/or control means for electronically assigning discrete said bin numbers to respective said job output sheet collection bins, and for electronically assigning different said discrete bin numbers to different said shared users of said job printer; optical sensing means in said sheet input means and operatively connecting with said control means for detecting said marked area encoding on said cover sheet and determining if it corresponds to a said assigned bin number; sheet bin selection and feeding means, controlled by said determination of said optical sensing means and said control means, for selectively feeding said output sheets from said sheet input means to designated said output sheet collection bins subsequent to a said detection by said optical sensing means and said control means of a preceding said cover sheet with said marked area encoding corresponding to a said assigned bin number for a said designated shared job printer user, for said job sorting and further including automatic telephone dialing means connecting with said control means; said control means being adapted for inputting and non-volitilely storing preprogrammed telephone numbers electronically assigned to respective said assigned bin numbers; said automatic telephone dialing means being automatically actuated by said optical sensing means and said control means in response to said detecting of at least one uniquely marked area of a said job cover sheet corresponding to a said assigned bin number when there is at least one said preprogrammed telephone number assigned to that bin number; said automatic telephone dialing means automatically dialing said preprogrammed telephone number for said bin number upon said actuation; further including receipt messaging means for electronically transmitting a pre-recorded message indicating that a printer output job has been received, said receipt messaging means being actuated in coordination with said actuation of said automatic telephone dialing means by said control means to automatically transmit said pre-recorded message to said telephone number preprogrammed for said assigned bin number for said bin into which said output sheets have been fed by said sheet bin selection and feeding means.

Further specific features provided by the system disclosed herein, individually or in combination, include those wherein said job sorting accessory unit has bin locking means for restricting access to individual said bins thereof, and electrical bin unlocking means operatively connecting with said control means for unlocking said locking means for at least one said bin in response to entry of a bin access code; and/or wherein said job sheet sorting output accessory unit is an independent mailbox unit not requiring any electronic connection to said job printer to operate therewith; and/or wherein said unique marked areas encoded on said cover sheet provides for said detection of an assigned bin number and the number of sheets in the job following said cover sheet to be fed to a designated bin by said unit, and are printed by said printer using the same optically readable printing indicia used to print said job output sheets; and/or wherein the number of said output sheets sequentially following a so encoded cover sheet which is fed to one said discrete collection bin by said sheet bin selection and feeding means corresponds to said number of sheets in the job encoded on said preceding cover sheet.

BACKGROUND OF THE INVENTION

By way of background, various types of facsimile or facsimile controls, including facsimile readable encoded job cover sheets, are known in the art. The following patent disclosures and products are noted as examples:

Of pioneer interest re facsimile coding methods is Xerox Corporation U.S. Pat. No. 4,086,443, issued Apr. 25, 1978, to Gorham, et al., filed May 3, 1977. It shows cover sheets (called address cards) with a distinctive leading and trailing edge border (on both sides) bar coding pattern 84, detectable upon feeding into the facsimile transmitter scanner, which cover sheets can be marked [encoded] with telephone numbers also read by the fax transmitting unit, to automatically place facsimile sending telephone calls for the subsequently automatically fed sheets. FIG. 5A and Col. 8 indicates that "each row of the instruction field 85 is preceded by another distinctive bar code 86 . . . ". [A column of black squares is shown for 86.]

The recently announced Xerox Corporation developed "PaperWorks" TM product utilizes a special encoded fine pattern of special marks ("glyphs"), electronically recognized as such using PC computer software by the facsimile electronic image receiver. ["PaperWorks" TM and information thereon is commercially available by calling 1-800-432-9329.] It was initially configured to operate on a conventional personal computer having a conventional internal fax card and a modem, electronic mail system or other network connection to telecommunications, and running "Windows" TM software. A "PaperWorks" TM fax form carries a coded identification region which, upon scanning, may be decoded by an appropriate processing system. This coded identification allows the system to determine which of several different pre-stored forms the received form is, and what its page layout is. From this, the system can also extract the necessary user-entered information from the form to facilitate processing. An important feature of the "PaperWorks" TM system is the use of data defining a control sheet image to provide information in accordance with which operations are performed on data defining a sequence of images [data defining images, not actual physical sheets of a medium]. For example, the control sheet image can include information indicating a designation to which the fax server then transmits data defining said sequence of images.

For example, "PaperWorks" TM can respond to a fax transmission of a form that has checkable boxes, each needing only one mark to indicate desired recipients of a requested fax transmission. In other words, a user can mark check-boxes on a cover sheet form to indicate the recipients to whom a fax transmission is requested, where those recipients facsimile numbers were previously programmed in the PC in a recipients index. The form can alternatively or also include plural check boxes that are plurally marked with a recipient's entire fax telephone number. More specifically, when the special form is transmitted to the user's fax server (the user's PC with a fax card and "PaperWorks" TM software), the fax server can cause fax transmissions to the indicated recipients. The fax server can do this by decoding machine readable marks on the form to obtain an identifier of the form; using the form identifier to retrieve a pre-stored form description; using the form description to determine which parts of the form are fields with check boxes that could indicate recipients; analyzing the contents of each recipient's check box to see whether it is marked; and then making the requested fax transmission to each recipient whose check box is marked. The last steps involves PC auto-dialing of telephone numbers of other faxes directed from marked indicia on the faxed "smart" "stored document distribution form," which form can be faxed from a PC receiver, as further described below. (Or, the set of forms could be carried around by the user, obviating the first step of retrieving a starter form.) The PC fax card dials a fax number, either read from a form or previously stored in the PC's fax card memory.

If a user's fax server receives a fax transmission of a document that is not preceded by a "PaperWorks" TM form, the fax server treats the document as ordinary fax mail. That is, if a document is sent to the PC without a cover form, the PC will normally route the fax image as a document into the PC electronic inmailbox, thereafter alerting the user of new mail. An icon on the PC screen display may be modified to indicate that such fax mail has been received, and list these documents when the user requests a listing of fax mail. The user can then display or print the document.

To further describe "PaperWorks" TM system (PW), capabilities by example, a remote user with access only to a fax machine may, simply by faxing a blank sheet to his or her own PC (which has been appropriately programmed to run upon receipt of an instruction from its fax card) start the system. The PC's "PaperWorks" TM (PW) software can interpret the faxed blank sheet as a request by the user for a starter form. PW then creates a starter form by assembling instruction fields and user selectable items within those fields, and organizes the form according to a form description language. The particular layout of the starter form is stored, along with an identifier, such as a number. The identifier is added to the form layout as coded indicia ("glyphs"). PW dials back the remote user's fax machine telephone number (acquired through system handshaking or user-entered, as appropriate) and faxes back the form. Here, the remote user's fax machine functions as a printer. The remote user may then request by fax from his or her PC further forms allowing him or her to retrieve, store, distribute or delete documents in his or her PC. Assume he or she selects the "retrieve" option, by checking on the starter form a list of retrievable items desired. he or she dials her PC again, and faxes to it the now marked-up starter form. The PC identifies the received document as a form and finds and decodes the glyphs, obtaining the form identifier therefrom. With this information, and the page description language, the PC is able to determine what the remote user wants next-in this example a retrieve list form. This form is constructed and faxed back to the remote user in a manner similar to that described above. Now, in this example, suppose the remote user receives handout documents at a remote meeting and wishes to fax them back to his or her home office. As above, the remote user obtains a starter form by fax from his or her PC, and indicates on it that he or she wants to store documents. The form can also have a region which allows he or she to "name" the document being stored with a handwritten file name. This allows naming or labeling of a document without requiring access to any keyboard (OCR/OMR need not be performed on this handwritten file name). The remote user then faxes this form as a cover sheet for and with the handouts to his or her PC. The PW software causes the handouts to be stored as an image file in the PC with the associated handwritten file name. The remote user may also wish to distribute these handouts to others. This is facilitated by a PW form which allows the remote user to indicate thereon a document stored on his or her PC and to indicate fax destinations for that document. Each such form carries an identifier of itself and also user modifiable fields for allowing a user to cause one or more actions to occur based on marks imparted on the form. The receiving computer's software interprets and acts upon them.

Further noted in this regard is Xerox Corporation U.S. Pat. No. 5,060,980, issued Oct. 29, 1991 to W. A. L. Johnson, et al, entitled "Form Utilizing Encoded Indications for Form Field Processing", disclosing a facsimile transmittable form carrying a layout description of itself in coded data, markable boxes, and, optionally, instructions to a processor on how to process the form. Also, Xerox Corporation U.S. application Ser. No. 07/855,987 [D/91582] "Method and System For Labeling A Document For Storage, Manipulation, and Retrieval"; U.S. application Ser. No. 07/856,107 (D/92127) of Walter A. L. Johnson et al., filed Mar. 20, 1992, entitled "Techniques for Automatic Form Creation by Combining Partial Operations"; and U.S. application Ser. No. 07/854,520 (D/92165) of Walter A. L. Johnson et al., filed Mar. 20, 1992, entitled "Using a Form to Request Automatic Form Creation." The Xerox "Telecopier 495" TM product used a marked "sense" sheet to implement its security provisions.

Turning to other facsimile control systems, U.S. Pat. No. 5,115,326, filed Jun. 26, 1990, issued May 19, 1992 to Burgess et al., and assigned to Hewlett Packard Company states, e.g., in part, in its Abstract: "A fax message transmitted by a facsimile transmitter includes bar coded headers in its first page. At least one of these headers contains the name of an addressee that is also a user on a network. A fax server receiving the incoming fax message inspects the first page of the incoming facsimile to locate the bar coded headers. If a TO: header is found it is used to determine the corresponding E-mail address, and the fax is automatically routed as E-mail on the network to the addressee . . . The fax server or some other application running on a computer served by the network may be the addressee . . . "

U.S. Pat. No. 5,051,779 to Yuji Hikawa, issued Sep. 24, 1991 to Fuji Xerox, is on a generalized job control sheet, utilizing a special encoded fine, critical, pattern of special marks which must be electronically recognized and read comprising (necessarily pre-printed) line drawings with a certain low correlative angle to longitudinal and transverse directions of the sheet, with the appearance of a varied pattern fine slash marks of two alternating angles. Said U.S. Pat. No. 5,051,779 is of particular interest in that it provides for single marking of a "FAX Number" "Registered Name" indicated area on the control sheet, and also two "Number of Copies" area selections from a column thereof. This job sheet is apparently for an input image scanner for either a printer or a facsimile system, although the latter is only briefly noted.

Another Fax coding related patent is U.S. Pat. No. 4,893,333, issued Jan. 9, 1990 to Paul and David Baran, assigned to Interfax, and its pending reissue and art therein. It indicates in its Abstract that "the remote facsimile transmitter user marks paper selector sheet form [sic] using a pencil or pen" . . . for selective retrieval of text and graphics. Another such patent is U.S. Pat. No. 4,430,563 to Harrington, discussed below.

Also, Japanese Laid Open No. 63-242060 laid open Oct. 7, 1988.

The "User Handbook, Version 3.01" ©1988, for the Xerox, "FaxMaster 21" product, indicates that it can automatically load hours of multi-page, multi-destination, facsimile transmission documents, and send them all with a few simple keystrokes, and can retrieve document from multiple locations, print them at the hub, store them on disk for later printout, or forward them to other facsimile terminals [automated store and forward]. It provides electronic mail capability by storing documents for retrieval by remote network users. It provides confidential [electronic] mailboxes, enabling secure document reception for only authorized personnel. It utilizes a personal computer with software, and can use remote touch-tone telephone access to the hub unit.

EP Publication No. 0 354 703 A2 published Feb. 14, 1990 by Canon for Sato, et al., based on Japanese Application Nos. 193232991/88, 2236261/88 and 3129261/88, discloses a multi-functional information processing apparatus with an image scanner, telephone or facsimile function and performing facsimile or regular calling in accordance with key word searches. It can also be controlled by a business card reader (image scanner) reading telephone numbers on regular business cards.

*Xerox Disclosure Journal*, (XDJ) publication, Vol. 13, No. 4, page 193, July/August, 1988, by R. M. Johnson, entitled "Flash Mail", states, in its entirety: "A receiver of an unattended telecopier is constructed so that received mail grouped according to zip code could have the address printed on the reverse side of the message sheet. The receiver has duplexing capability. The sheet is then automatically folded and sealed with a weak adhesive. The letter then passes through a postage meter and is then sorted and delivered. The weak adhesive enables the letter to be readily opened without tearing."

Of particular interest, especially re voice telephone notification to recipients of fax messages, is U.S. Pat. No. 4,654,718 to T. Sueyoshi, assigned to Fuji Photo Film Co. It refers to facsimile correspondence containing codes for telephone numbers, and sensors in the receiving equipment for reading these telephone codes. This patent also notes in Col. 1 that facsimile systems can include in-house line systems. Said U.S. Pat. No. 4,654,718 in column 1, line 60 et seq., states that: "A first object of this invention is to provide an equipment which is attached to a facsimile receiver and which identifies, upon receipt of a piece of correspondence through a facsimile system . . . the telephone number of the ultimate addressee of the arrived piece of correspondence, connects a line with the identified telephone receiver, and sends a recorded message to the identified telephone receiver, thereby informing the ultimate addressee of the arrived piece of correspondence, of the arrival of a facsimile correspondence." FIG. 1 and Cols. 3–4 generally verbally indicate that an OCR or mark sensor [not disclosed?] can read or sense on the arrived facsimile correspondence the number of an ultimate address if it is in a specific location or with a special prefix or suffix signal [not disclosed?]. Col. 4 further states that an endless tape recorder transmits a recorded message including a notice of the arrival of correspondence at the facsimile receiver. However, note that for said U.S. Pat. No. 4,654,718, a sender of a fax sheet would need to put down the recipient's entire phone number on the sheet. A memory unit is used for temporarily storing the phone number indicated an the incoming fax, but that memory is apparently erased for receiving new phone numbers after the recipient is called. This equipment is apparently only for one-time telephone notification per facsimile message.

Although not part of a facsimile system, it is reported that a feature of an "Octel System 200" voice mail system is called "outcall notification" and may be as follows: when one receives a message on his voice mail system that telephone system dials your pager number to alert you that you have a message. One's voice mail box number and pager number are both dedicated. Also, of course, manually, for many years, a Western Union operator would call a person to let them know that their telegram came in.

Job control sheets for printer control-bar code printed copy sheets readable by an image input scanner for a printer to control printer operations-are known, for example, from Xerox Corporation U.S. Pat. Nos. 4,602,776 by York; 4,970,554 (D/87351C) by Rourke; 4,757,348 by Rourke et al; FX U.S. 5,126,858; and Eastman Kodak Corporation 4,987,447. Hand-marked copier job control sheets, with bar code identifiers, fed as and with documents to be imaged, are disclosed in Xerox Corporation U.S. Pat. No. 4,248,528, issued Feb. 3, 1981 to R. B. Sahay.

Of course, it is known to read optical or magnetically readable printed marks on a sheet itself (as opposed to cover sheets) for other sorting functions and purposes, such as for checks or deposit slips, old IBM punchcards and their multi-bin sorters, machines sorting physical (Post Office) mail by zip code, bar code label readers for product or invoice sorting, U.S. patents now printed with bar codes on their first page, and the like.

U.S. Pat. No. 3,804,005 to Burger et al. (AM Corp.) discloses a method of controlling a reprography machine [offset plate printer] wherein a code is formed along at least one edge of a master. The code contains instructions as to a number of copies to be made from each master and a manner in which the copies are to be distributed. A computer apparatus which is responsive to the code is provided for carrying out the instructions. See, e.g., FIGS. 2 and 3.

U.S. Pat. No. 4,352,012 to Verderber et al. discloses a header sheet for use with an automatic image communication transmissions system, (facsimile). The header sheet includes a peripheral border 11 of regularly spaced hash marks on both its front and back faces to identify the sheet as a header sheet. A data area of the header sheet comprises two basic portions: a first sender identification area 20, and a second addressee identification area 30. The data areas are coded by their positions in a raster scan for interpretation by the communication system to control a transmission operation. The data areas comprises a number of defined oval areas 51 to be marked by a user with pen or pencil, in accordance with information intended. See FIG. 1. The header sheet is scanned by a scanner at the transmission end before transmission.

U.S. Pat. No. 4,430,563 to Harrington discloses a data processing form for providing control information to apparatus, such as facsimile machines, having a scanner. The form has darkened areas which establish a row and column format with an elongate edge mark for each row. The edge marks extend to the edge of the form. Areas to be filled in by a user are defined using some of the darkened areas. The form format minimizes software needed for circuitry used to process information obtained from the form.

U.S. Pat. No. 4,348,101 to Schonfeld et al. (Sperry Corp.) discloses a duplex laser printer which prints discrete bar type codes on copy sheets in process for pagination control information.

U.S. Pat. No. 4,939,354 to Priddy et al. is only of background interest as disclosing one type of optically machine readable binary code.

Of particular background interest, job separation "mailboxes" per se, broadly speaking, are known in the art. A printer mailboxing system with locking bins is further noted below-the Xerox Corporation EPO application No. 0 241 273 published Oct. 14, 1987. Unlocked or open bin copier or printer "mailbox" art includes U.S. Pat. No. 5,098,074 issued Mar. 24, 1992 to B. P. Mandel, et al., by Xerox Corporation. See especially FIG. 4 and its description. In particular, it discloses automatic copier or printer output stacking of plural sets of pre-stapled, precollated, plural sheet copy sets into selected "mailbox" bins, i.e., more than one job set per bin.

U.S. Pat. No. 4,849,790, issued Jul. 18, 1989 to M. Ito (Minolta) is of interest as showing a copier document feeder with plural input and output bins or trays for different document jobs, maintaining job segregation.

Automatically stacking more than one unstapled copy set into sorter bins, with set offsetting, by bin side-shifting for increased bin capacity, is described in the Xerox Disclosure Journal Vol. 14, No. 1, January/February 1989, p. 29, and Sharp patent U.S. Pat. No. 4,688,924. Copier output tray side-shifting for set offsetting is well known, e.g., U.S. Pat. No. 4,157,059. In-bin set tampers, another way of providing set offsetting, are disclosed, e.g., in U.S. Pat. Nos. 5,044,625, 3,860,127; 4,134,672; 4,477,218; 4,480,825; 4,616,821; and 4,925,172, and art cited therein.

The use of otherwise conventional existing sorters for [unlocked] printer output sorters or "mailboxes", and printer "mailboxing" in general, is discussed in Col. 1 of U.S. Pat. No. 4,843,434 issued Jun. 27, 1989 to F. Lawrence, et al, by Gradco Systems Inc.; and U.S. Pat. No. 4,763,892 issued Aug. 16, 1988 to H. Tanaka, et al.. A modular unit sorter is generally indicated in Col. 1 to be for sharing a printer with a plurality of users, sorting and compiling copies by user, in Seiko Epson Corporation EPO Application 0 399 565 by Shigeru Sawada, et al, published Nov. 28, 1990. Printer products observed with integral open sorter bins [the bin selection system is not known] include the Canon NP-9030 sold for several years with a sorter option; the Kyocera F-2010 and F-3010 laser printers with their 5 bin sorter option (1988?); and Océ van der Grinten Corporation's recently commercially displayed "6750" and "6800" printers configurable with either 20 or 40 bin optional programmable sorter/mailboxes. "Mailboxing" by bar-coded tape which is taping together output sets of a printer output is mentioned in the paragraph bridging pages 25-26, by Murray O. Meetze, for the same assignee, filed Dec. 16, 1991, as U.S. Ser. Nos. 07/808,241 and 07/808,133.

The term "mailbox", as used herein, as noted, refers to handling or sorting physical or hard copy sheets, not electronic images or documents, which are much easier to manipulate. A "mailbox" may more specifically, as in the example herein, refer to temporarily or permanently assigning a unique and predetermined electronic address to respective ones of plural bins of sorter-like equipment for a copier, printer or facsimile machine output, and enabling a particular user's output of one or more jobs to be directed into one or more selected bins so assigned. It may or may not include means for locking the bins and unlocking access thereto, as indicated above and as in the example herein. It may or may not additionally include a bin assignment scheme wherein each bin has an associated LCD or other type of display with the appropriate user name or label displayed, and/or a common or central display, as in the example herein, and/or wherein jobs are placed in more than one available bin if needed, i.e., if the sheet stacking capacity of one assigned bin is exceeded. A mailbox for a laser or other electronic page input printer may desirably stack precollated sets of sheets into a selected bin, rather than additionally or alternatively functioning as a normal collator or sorter, since the electronic printer can normally more easily reorder and recirculate the pages being copied to copy them in precollated order rather than making plural directly sequential copies of each page requiring post-collation in a sorter or collator.

The problem of keeping shared (networked) printer job outputs from becoming mixed up, or accidentally removed by others, is serious enough that some users have for several years placed manual mailboxes, like Post Office boxes, adjacent the printer, with the boxes labeled with different user names, for manual job sorting. Likewise, for shared hard copy facsimile machines.

A desirable additional feature for mailboxing systems is to staple or otherwise bind, fasten or finish the sheets of each job together, so that plural finished sets are removable as such from the user's bin(s), maintained neatly stacked and separated from other jobs by being fastened. This can be done by pre-compiling and stapling sets before they are placed into designated mailbox bins, as in the above-cited U.S. Pat. No. 5,098,074 to Mandel. Alternatively, it could be done by using in-bin stapling, which is well know for sorters, e.g., Xerox Corporation U.S. Pat. No. 3,884,408 to L. Leiter et al.; U.S. Pat. No. 3,944,207 to Bains; U.S. Pat. No. 3,995,748 to Looney; U.S. Pat. No. 4,687,191 to Stemmle; U.S. Pat. No. 4,681,310 to Cooper; and U.S. Pat. No. 4,925,171 to Kramer, et al.. Also, Xerox Corporation R/84007 U.K. 2 173 483-A GB published Oct. 15, 1986 by Denis Stemmle; and R/81011 U.S. Pat. No. 4,687,191 issued Aug. 18, 1987 and published in the EPO as 0198970-A1 on 29.10.86. Also, U.S. Pat. No. 4,083,550 issued Apr. 11, 1978 to R. Pal. Other Xerox Corporation patents include Snellman et al U.S. Pat. No. 4,145,241 and Hamlin et al U.S. Pat. No. 4,564,185 on edge jogging and glue binding sets in a sorter or collator and/or stapling of the post-collated copy sets.

Another desirable "mailboxing" feature is secured bins. Prior art on lockable and unlockable copier or printer bins or mail boxes for the output sheets thereof includes the above-cited EPO application No. 0 241 273 by Xerox Corporation published Oct. 14, 1987, [D/86031 EP], entitled "Limited Access Reproducing Machine Bins", disclosing a reproducing machine with lockable and unlockable bins which can be selected by the user for receiving copy sheets, precollated or uncollated. It teaches alternatively remote user or laser printer input, with copy bin lock boxes, and central computer display bin electrical bin unlocking entry and control usable herewith. Further as to bin locking, U.S. Pat. No. 4,470,356 entitled "Word Processor-Controlled Printer Output Bin Lock Box", issued Sep. 11, 1984, to Datapoint Corp., by D. Davis, et al., discloses a lockbox insertable and removable from an output bin. A security door is closed to allow removal of the box. U.S. Pat. No. 4,437,660 entitled "Word Processor Controlled Printer Output Scanner Mechanism", also issued Mar. 20, 1984 to Datapoint Corp., discloses a scanning mechanism for scanning individualized output bins collecting laser printer output for determining each bins availability, the degree of fullness, and whether or not a lockbox is positioned in the bin. U.S. Defensive Publication No. T102,102 entitled "Access Controlled Copier" Published Aug. 3, 1982 by Albert Bolle, et. al., discloses sorter bins which can be locked to the user by means of a badge reader or the like. The user-entered identification data is entered and recorded on the first copy which is delivered to the locked sorter bin or bins. IBM Corp. U.S. Pat. No. 4,414,579 entitled "Information Transmitting and Receiving Station Utilizing a Copier-Printer" issued Nov. 8, 1983 discloses a secured mailbox located at the bottom of the collator. Xerox Corporation reportedly provided modified copier sorters with locked bins for at least the U.S. State Department many years ago.

Among examples of keyboard or keypad enterable electronic security systems in general are U.S. Pat. No. 4,970,504; 5,014,049; and 5,021,776.

Additionally noted is the Ricoh FAX4000L facsimile machine, which describes in its literature the following feature called "Confidential Transmission": "If the other end has memory and the confidential reception feature, you can use confidential transmission. The other end can only print the message after they enter the terminal programmed password .... For extra security, you can specify the password for the message. This personal password will override the password that the other terminal user has previously stored in their machine, which would normally be used for printing confidential messages. Coordinate with the receiver operator before using this feature. This feature works if the receiver is using a recent Ricoh [only?] memory facsimile terminal."

On another optional or desirable feature, art relating to sorter bin assignment schemes wherein the bins have an associated LCD or the like type of visual display includes U.S. Pat. No. 3,905,594 to Davis; U.S. Pat. No. 4,437,660 to Tomkins et al noted above; U.S. Pat. No. 4,501,419 to Takahashi, et al.; and U.S. Defensive Publication T102,102 to Bolle et al., noted above. Also, Fuji Xerox Corp. FX-10475 Japanese Application No. S 59-55424, filed Apr. 17, 1984 and published on Nov. 6, 1985 as Koksi No. 60-167054.

On another optional or desirable feature, the control and operation of multi-bin sheet collators or sorters to use or group more than one adjacent bin when the number of sheets in a copy set will exceed the capacity of a single bin is known, for example from U.S. Pat. No. 4,522,485, the immediately above-cited Takahashi et al. U.S. Pat. No. 4,501,419, or U.S. Pat. No. 4,134,581, and various above and other references. There were also commercially available for many years sorters in which bins were addressable by punched card or paper tape controls. Said U.S. Pat. No. 4,501,419 is also of interest as showing individual pivotal bin gates, which gates also have another surface normally providing a "ski" or baffle for holding sheets against the sorter transport belt as they move past the array of bins until they reach the selected bin (see especially FIG. 3 thereof).

When a sorter unit is to be alternatively used for, or converted to use for, a printer mailbox unit, it may be desirable to increase the available sheet stacking space between bin trays or shelves to increase bin capacity. Moving or removing sorter bin shelves for doubling or tripling the number of multiple copies which a particular bin can receive is taught for a sorter per se in U.S. Pat. No. 3,907,279 issued Sep. 23, 1975 to J. H. Erwin by AM Corp. See especially Col. 3. Doing so for different numbers of copies or documents to different users in preprogrammed bin sequences is suggested in Col. 1.

A sorter or collator modular unit description which indicates that it can accept copy sheets inputted from either of two opposite sides thereof from a copier or printer, with or without inversion for face up or face down output, and other typical sorter options or modes, such as noncollated top bin only stacking or progressive bins sort stacking of identical copies, is in U.S. Pat. No. 3,638,937 issued Feb. 1, 1972 to L. J. Schulz, et al. [3M]. However, it appears from the further description in Col. 8 thereof that the one said side entrance 14 will always invent the input, and the other side 13 entrance will always not invert the input, so that this unit would not actually be interchangeably usable with all left or right end outputs. Mita U.S. Pat. No. 5,056,768 is noted re selectable right or left hand printer output. Xerox Corporation U.S. Pat. No. 3,866,904 issued Feb. 18, 1975 to D. J. Stemmle shows inserting sheets into a set of sorter bins from either side thereof for simplex or duplex copies. i.e., with or without inversion, but all copies enter that unit from one side of the sorter module.

As to usable specific hardware components of the subject apparatus, it will be appreciated that, as is normally the case, some such specific hardware components are known per se in other apparatus or applications. For example, various commercially available stand-alone, self-controlled modular sorter units are known for sorting the output of xerographic copiers or printers. Examples include above-cited art and its references. One commercial example is cited and disclosed in the embodiment example hereinbelow. In particular, for examples of sheet feeding side registration systems and hardware, noted are Xerox Corporation U.S. Pat. Nos. 4,487,407; 4,411,418; 4,621,801; 4,744,555; 4,809,968; 4,919,318, and 5,065,998.

In the description herein the term "sheet" or "hard copy" refers to a usually flimsy sheet of paper, plastic, or other such conventional individual physical image substrate, and not to electronic images. Related, e.g., page order, plural sheets, documents or copies can be referred to as a "set" or "job". A "job" may also refer to one or more documents or sets of documents beings sent to or received by a particular addressee or designee. The term "document", unfortunately, unless defined, is used ambiguously in the art by others to refer to either a single page or multi-page set or job, especially (but not always) as that which being transmitted or copied. "Original" is more specifically used for the latter. "Facsimile", or the common abbreviation "Fax", often refers to conventionally telecommunicated image data, in particular, documents facsimiled via a telephone system in accordance with CCITT Standards, and equipment therefor. However, for claim purposes herein, "facsimile" can also encompass "electronic mail" and/or system or network interconnected printers, networked with remote terminals and/or scanners, and remote printers, or the like, unless indicated otherwise. Plural mode (multi-function) combined normal printing and facsimile message receiver printing capability printers are known, and examples thereof are cited near the end of this specification. Facsimile can be sent and received by "fax cards" in PC's (personal computers) as well as with conventional stand-alone facsimile machines. The term "printer" encompasses hard copy output from various input sources, including facsimile, and conventionally refers to electronic document images input, versus a light-lens copier to which physical originals must be brought to be directly fed and imaged. The term "electronic mail" also has various broad meanings, and can include transmission by either external telephone lines, and/or shared internal networks using optical fiber, twisted wire pairs, coaxial cable, wireless transmissions, or other networking media, or combinations thereof, of documents for electronic remote terminal displays and/or printer hardcopy printouts, to any of the numerous addresses designated in the transmitted document.

The presently disclosed apparatus may be readily operated and controlled in a conventional manner with conventional control systems. It is well known in general and preferable to program and execute such control functions and logic with conventional software instructions for conventional microprocessors. This is taught by the various patents and various commercial facsimile machines, copiers and sorters. Such software may of course vary depending on the particular function and the particular software system and the particular microprocessor or microcomputer system being utilized, but will be available to or readily programmable by those skilled in the applicable arts without undue experimentation from either verbal functional descriptions, such as those provided herein, or prior knowledge of those functions which are conventional, together with general knowledge in the software and computer arts. Controls may alternatively be provided utilizing various other known or suitable hard-wired logic or switching systems.

All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example(s) below, as well as the claims. Thus, the present invention will be better understood from this description of an embodiment thereof, including the drawing figures (approximately to scale) wherein:

Brief Description of the Drawings

FIGS. 2A, 2B are two plan views of one example an easily encodeable cover sheet readable with the system of FIG. 1, wherein FIG. 2A is unmarked and FIG. 2B is one example of a marked cover sheet;

FIG. 2, is being optically read;

DETAILED DESCRIPTION

Figure 1:
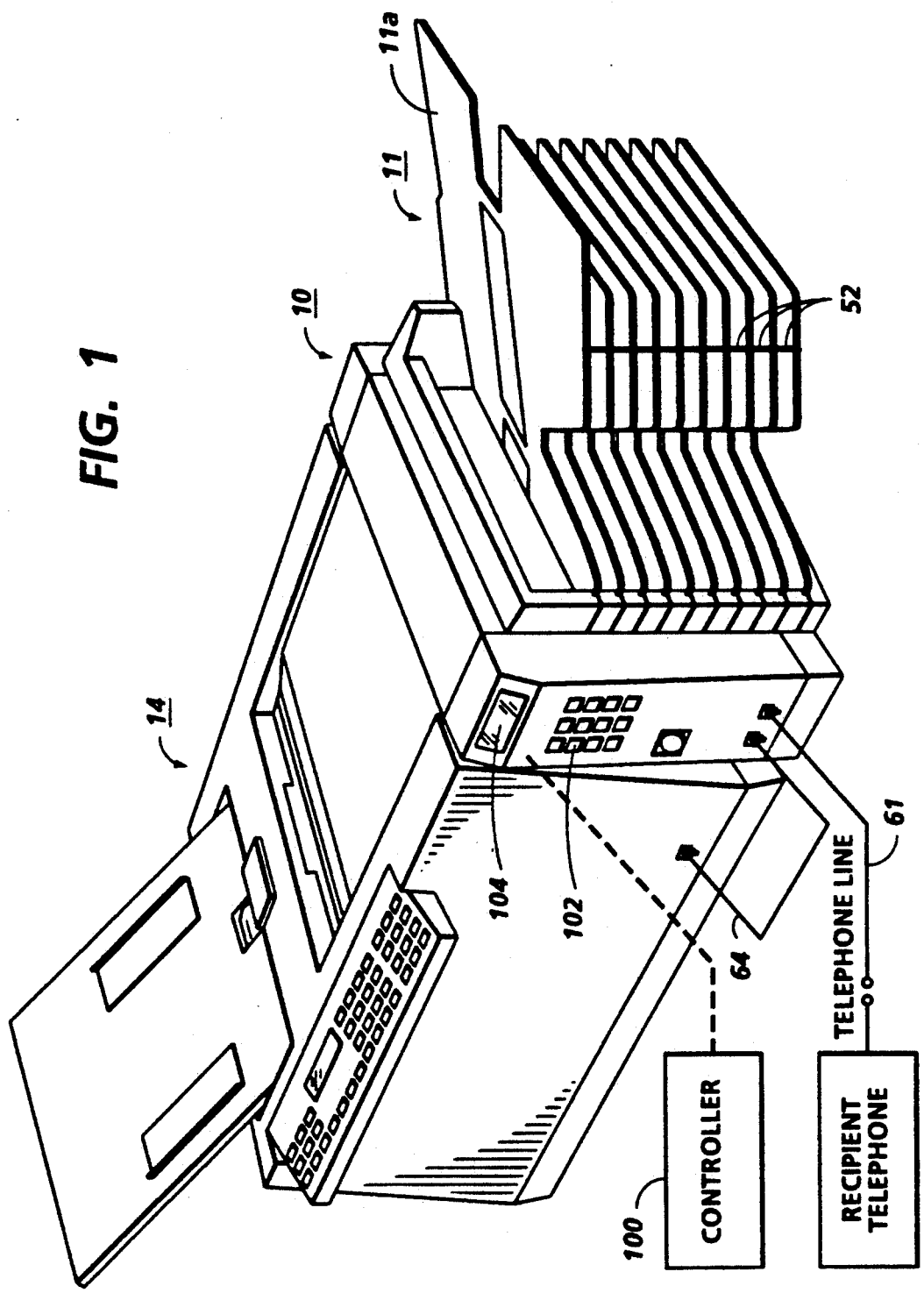
FIG. 1 is a perspective frontal view of one embodiment of the subject facsimile output sorting system unit operatively connecting with the output of one example of a conventional facsimile machine [for drawing clarity here, especially of the display panel and keypad, this unit is shown located at the right end of the facsimile apparatus, although output is usually at the left end or side thereof]

Describing now in the further detail the exemplary embodiment with reference to the Figures, there is shown a stand-alone facsimile or printer output job sorting unit 10, with plural bins 11, controlled by a marked cover sheet 12, by way of one example thereof. The conventionally facsimile received hard copy of the marked cover sheet 12 of a facsimile transmitted plural page document is fed into and optically read by the separate unit or sorter 10 to automatically control the particular bin 11 assignment and bin 11 destination of the cover sheet 12 and its accompanying plural page document job sheets. The sorter unit 10 reads the lead (cover) sheet 12 of the job, and directs that sheet and all other subsequent sheets of that job (indicated by the job sheet count indicator) to the bin number indicated on that lead or cover sheet 12.

As noted, the disclosed unit 10 can be a universal stand-alone unit that is attached to, or even simply moved next to, the output of almost any conventional facsimile machine, such as 14 illustrated, or an electronic mail or other printer such as 16 illustrated. (On some facsimile receivers or printers, it may be necessary or desirable to first remove an existing output catch tray. That output tray is often an easily removable "hung on" plastic unit, as in the Xerox Corporation "Telecopier ® 7020" facsimile unit, which is similar to the facsimile unit 14 illustrated in FIG. 1.) No electrical or mechanical linkages or interconnections are required. However, as will be additionally shown below, a common telephone line (the existing line for the facsimile machine), can be shared by the unit 10 with the facsimile machine 14 for the receipt messaging feature. All control information is obtained solely by optically reading the markings in marking areas of a received cover sheet 12 with an optical sensor array 30 in the unit 10 input area 20. This sensor array 30 comprises sensors 31, 32, 33 transverse the sheet path, adjacent one side of that input path area 20. Although the sensor array 30 is shown in the initial position of the unit 10 sheet input path, it could be located anywhere in the common sheet input path upstream of the area of the bins entrances where the sheets are separated by bin decision gate or gates.

As noted, and further discussed below, the job sorting unit 10 can take sheets inputted at input area 20 from various facsimile outputs 14a or other printer outputs 16, or multi-functional such units. The input 20 may, if desired, be provided with a pivotal or otherwise vertically adjustable input ramp, to align with various outputs. The input 20 may include, for example, a top input flexible frictional flapper or other top feeder (or normal forces ski) 22, and/or a bottom input feeder 24 such as the conventional frictional sheet transport belts feeder 24 illustrated. Since the output of the facsimile or other printer may be acquired sequentially as individual sheets as it outputs (before it stacks) no sheet separator is required for the unit 10, and thus a very simple input feeder can be used. It can even be positioned to reach into the pre-existing sheet output tray of the printer to pull the sheets out of that tray, as by rotating the elongated frictional flapper or ski 22 in a large radius. The flapper 22 functions here also as a nudger force or normal force ski to press the sheet against belts 24. Conventionally, the sorter unit 10 feeder may be simply actuated by sensing the entrance of a sheet.

Once each output sheet of the printer has been acquired by the input feeder 24 or the like of the unit 10, the further feeding may be done by the pre-existing roller and belt nips of the unit 10, which include feeding the sheet into conventional bin selection and feeding means, such as the illustrated movable belt 56 including or carrying a moving gate or sheet deflector 56a for deflecting the sheet into a selected bin by moving the belt 56 so that the moving gate 56a is adjacent the selected bin or tray 11 entrance. In the system herein, desirably each bin 11 except the top bin 11a is partially or fully enclosed, with a normally locked door 52 openable on one side (or end).

The input area 20 of the unit 10 further includes the optical sensor array 30, further described herein. It may be fixed or pivotally mounted over or under the sheet path through the input 20, preferably adjacent a sheet side or edge guide 28 extending along one side of this sheet input path. As shown, a skewed foam roller on a flexible shaft or other suitable sheet side registration drive 26 [note the prior art cited above] may be provided to move the sheet laterally (transversely) against the side guide 28 as well as further downstream into the unit 10. This insures that one edge of the incoming sheets, especially, any cover sheet 12, will be aligned with the side guide 28, and therefor aligned laterally with the sensor array 30 so that the three columns of markings thereon are respectively laterally aligned with, to pass under, the three sensors 31, 32, 33. Registration in the sheet movement direction itself is described below, and is relatively independent of changes in magnification of the reproduced code pattern, or sheet velocity, as long as the velocity does not substantially change during the time the code pattern is being read, since the cover sheet 12 has its own integral tracking code pattern, as will be described.

On a convenient upper surface of the job sorting unit 10 is located a conventional numerical keypad 102 and adjacent LCD or other operator display 104. Both are operatively connected with the controller 100, as will be described.

Figure 2A:
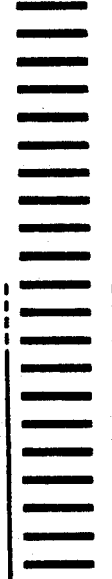
Figure 3:
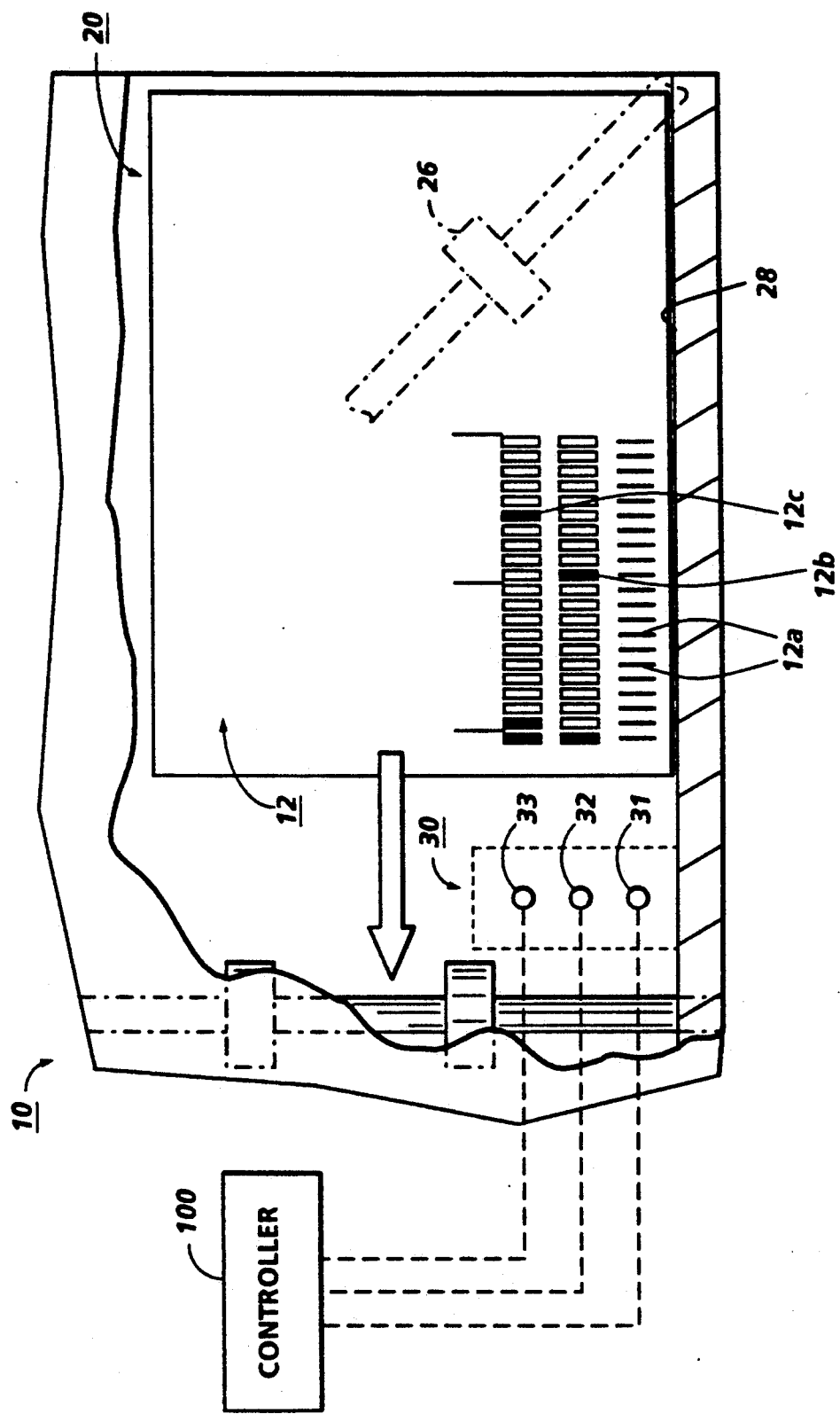
FIG. 3 is a partially, broken away view of the input area of the sorting unit of FIG. 1, wherein a received (faxed) cover sheet, as per
Figure 4:
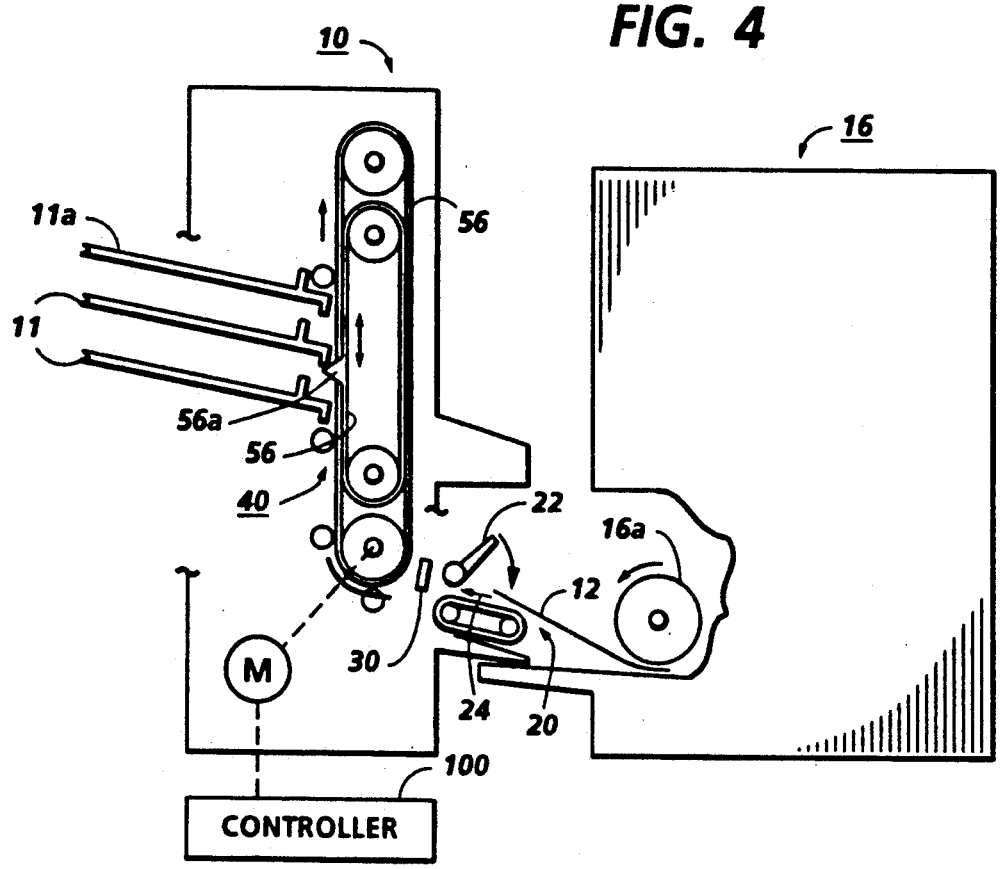
FIG. 4 is an exposed partial schematic front view of the prior commercial features of the output sorter unit embodiment of FIGS. 1 and 2 (but schematically shown here operatively connected to a general laser printer [such as Xerox "3700"] output rather than a specialized facsimile apparatus)
Figure 5:
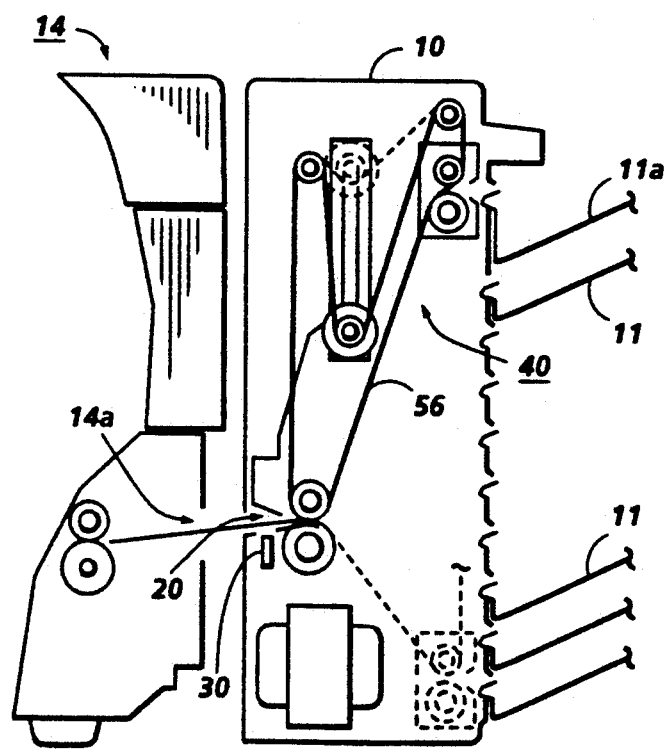
FIG. 5 is a rear exposed partial schematic view of the sorter unit embodiment of FIGS. 1, 3 and 4.

The cover sheet 12, with its printed code area patterns, may be provided in the product package and uncritically reproduced by customers. The exemplary cover sheet 12 here (see FIG. 2) has a first pre-printed code pattern 12a of dark lines aligned in a column in the sheet movement direction, along one side of the sheet, which pattern 12a is used as a reference for code line or positional identification, as will be further described below. Two rows of relatively large, wide, associated "marking boxes" 12b and 12c are also used for the code pattern here, providing for easy marking and large skew latitude. The code pattern needs to be properly located and oriented with respect to a corner of the cover sheet which will be properly aligned and registered when entering the device for passing the optical sensors that read the code pattern. Since the cover sheets having the code pattern may be reproduced by copying or faxing, the code pattern may become overly skewed in such copying and, therefore, invalid. For easy visual inspection by a user for the validity of the code pattern, the range of acceptable margins of the code pattern, as defined from the edges of the cover sheet, is indicated on the cover sheet between minimum and maximum limits as represented by a short and a long line width, respectively. The code reading software is written for identifying the bin number and number of sheets from code boxes 12b, 12c, even if slightly skewed, only partially filled in, unevenly spaced, or stretched.

The illustrated coding method here uses a code pattern having a first column of equally spaced darkened boxes 12a, and second and third columns 12b and 12c of equally spaced boxes with relatively large open rectangular areas uncritically defining marking areas for any dark marks, or their absence. These three columns of boxes 12a, 12b, and 12c are aligned in parallel with the paper path direction, and all the rows thereof are perpendicular to that movement direction. The code pattern is placed and aligned near a lead edge corner of a cover sheet 12 of a document set to be transmitted by facsimile. Functionally, this code pattern is divided into three segments in the sheet movement direction. The first segment consists of the three pre-darkened (pre-printed) boxes across the first row, which are read first by the code sensors 31, 32, 33 in the mailbox device 10 in order to define marking characteristics of a receiving facsimile machine. By also using the subsequently fed first column 12a marks read with sensor 31 as references for detecting the allowable position, width and intensity of an optical signal, subsequent boxes in the remaining two segments of 12b and 12c can be read regardless of any small variations in the magnification or reduction of a received facsimile image which contains the code pattern. The second and third segments of columns 12b and 12c are used for coding and identifying a bin number and the number of documents in the job, respectively. The second column 12b here is marked for the "tens" digit, and the third column 12c is marked for the "ones" digit.

Specifically, the principle of identifying the bin number and the number of sheets in this example is as follows. The reference positions of the pre-darkened boxes of the first column 12a detected by the corresponding first sensor 31 are used to search for only darkened boxes marked selectively in designated row locations along the second and third columns 12b and 12c. By this means, each time the first sensor 31 detects each darkened box 12a passing by it, it triggers each of the other two sensors 32 and 33 to check whether the box in 12b and 12c in that row under their sensor coverage is darkened. By means of a simple software program in controller 100, the orders or row positions of the darkened (marked) boxes detected in the second and third columns 12b and 12c determine the bin number and the number of sheets in the job.

A somewhat similar marking pattern has been successfully used for the last few years for "Ricoh Job Sheets" [actually, IBM card size job cards] with black pencil or pen markings in three columns of 10 open boxes each, "×1, ×10 and ×100", to mark the card with the desired "copy quantity", adjacent a similar column of 10 black premarked boxes [and other, following, job control information boxes, such as "copy size", "sort" or "stack", "duplex", etc.], optically read by a small optical job card reader attached electrically to the Ricoh 8780 and earlier Ricoh copiers.

As indicated, characteristics of the code pattern can conventionally be built into the software program for checking the validity of the code pattern. For example, the differences between the widths of the first column 12a marks and that of the boxes in the second and third columns 12b and 12c, the number of the darkened boxes in the first column, as well as other specific locations of darkened areas can all be used individually and in combinations as a whole for verifying the code pattern. Thus, if the sheet passing the optical sensor array 30 is not a cover sheet, even if it has intermittent dark image areas in the code pattern areas passing the sensors, it is virtually impossible that both the beginning and ending positions of the dark image areas would correspond to a correct cover sheet code on-off signal pattern for the first respective spaced pattern 12a or a one or two digit (only) bin number and page number. [Note also that any jobs with a sheet which cannot be properly read are preferably simply default directed to the top or open bin. Thus, that does not cause a stoppage or jam.]

Since the sorter unit 10 can be conventional, even commercially available (e.g., the Minolta S-10 II sorter), except as modified as described herein, there is no need to describe herein its conventional feeding and gating arrangements whereby inputted sheets are fed to and gated into selected bins, by separate associated bin gates or, as here, a moving gate or sheet deflector mechanism, as is well known in the art. Shown here is a movable belt 56 system for a moving sheet deflector 56a to selectably deflect sheets from a vertical feed belt transport system into the selected bin, in a well known manner. [As will be shown, this system may also be desirably integrated into a bin locking system.] Such a simple ten bin sorter unit can be easily slightly modified to leave one open or public bin and provide up to nine addressable locked bins. These may be provided with, e.g., up to 90 programmable associated phone numbers dialing automatically upon receipt of a cover sheet designating a bin. The top bin or tray 11a of the sorter 10 is, conventionally, the open or "public" bin, since it is not limited in stack height by any overlying tray. As is well known in sorting in general, such sorter bin units 10 can be extended or serially connected to provide more bins, if desired.

Note that if direct paper feeding from a facsimile output 14a to the input 20 of the disclosed sorting unit is not available, that any or all of the facsimile output sheets can be hand-fed or loaded into the unit, and it can still function as desired. A conventional stacked set sheet separation feeder can be optionally provided at the input 20 in that case, or in a parallel input, if desired.

The sorter or "mailbox" unit 10 here can be conventionally plugged into the existing fax telephone line 61, and a short standard telephone line connector wire 64 then connected between this unit and the fax machine 14 telephone line input connector, so that they can both share the same telephone line 61. The unit 10 is desirably conventionally, independently, electrically powered simply by conventionally plugging into the power line.

In contrast to various references cited above, in the embodiment herein, the cover sheet does not have to be marked with codes for whole telephone numbers-only brief codes for the bin number and number of sheets. Sensors in the receiving device do not need to read whole telephone number codes-they only need to read one or two indicia marked to indicate a bin number and the number of sent sheets. The associated conventional microprocessor memory unit here is non volatile and is used for storing the bin numbers and corresponding phone numbers until they are changed by the users. They are not erased when receiving new fax. The present device is primarily for storing fax documents in designated bins, for which phone numbers can also be assigned, as described subsequently below.

If desired, the control software can interrupt a fax transmission upon detecting an attempted (marked) but invalid code pattern receipt, to warn the fax sender, or call a designated local key operator. Likewise, the unit can be programmed to call a preprogrammed telephone number of a key operator in the event of a paper jam or other malfunction.

Since most facsimile machines have facedown and 1 to N page order output, the optical sensors in the unit may be under the input paper path, in a gap or apertures in the conventional paper path lower baffle. However, to universally also accommodate those facsimile machines, and printers, with faceup output, the unit can also have 3 more sensors similarly positional above the paper path. Alternatively, an optional inverter or alternate input path with a natural inversion in it before the sensors may be provided.

The term "keypad" as used herein is intended to encompass any simple or low cost type of conventional numeric or alphanumeric keyboard, CRT touch-screen areas, or other keystroke capturing devices, or voice input alternatives.

Figure 6:
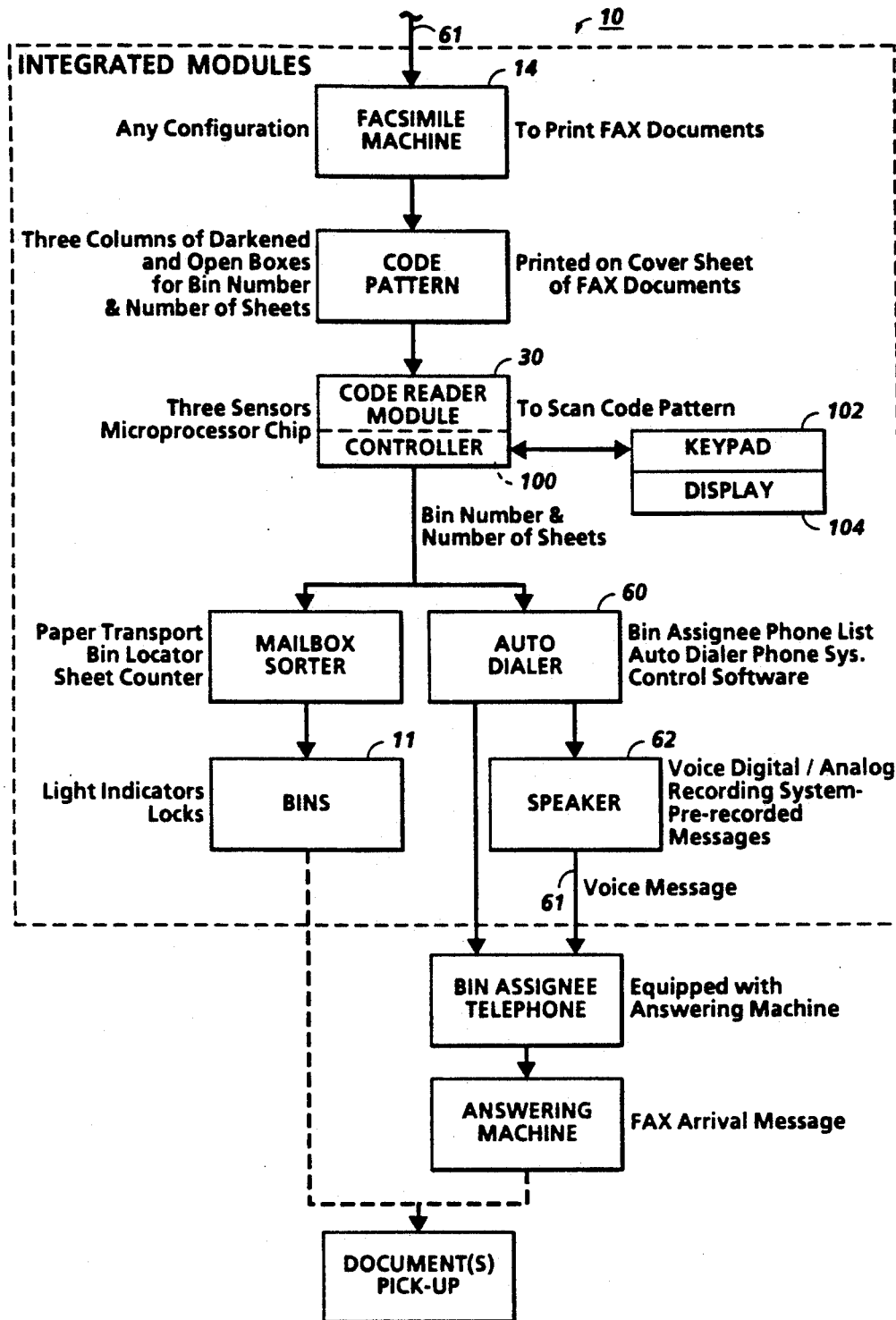
FIG. 6 is a schematic flow chart of the operation of the embodiment of FIGS. 1-5, and also an integral automatic telephone dialing system usable herewith.
Figure 7:
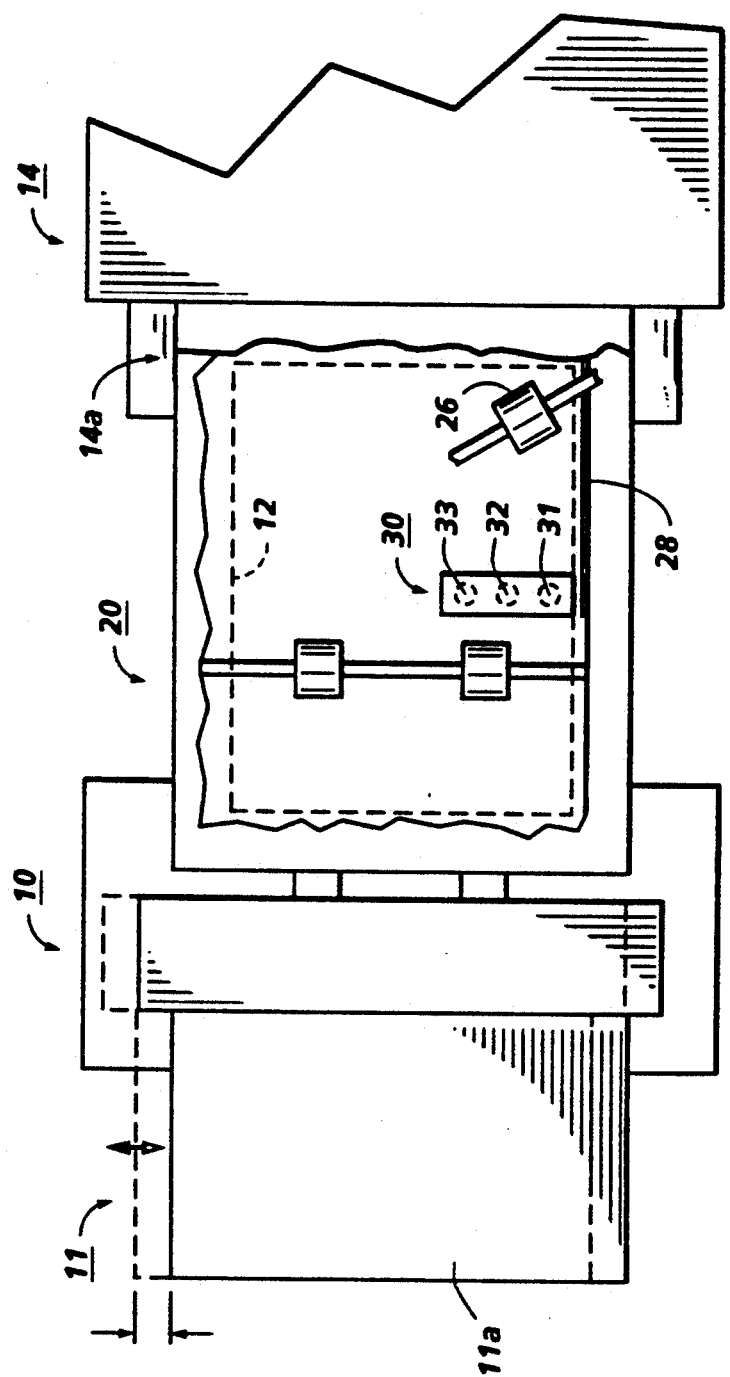
FIG. 7 is a schematic top view of the embodiment of FIGS. 1-6, with the input area partly uncovered, and further illustrating an optional additional feature of lateral side-shifting of the bins for offset stacking.

Referring now to FIG. 6 in particular, there is disclosed an additional feature (which is the particular subject of this application), utilizing most of the same apparatus and system. It provides for the receipt of a fax, or other addressed printer output, with an encoded cover sheet "read" by the receiving system, to also automatically dial the designated recipient's telephone number, controlled by the same cover sheet coding and reading system, and, preferably, using if same phone line 61, and then play a recorded message telling the designated recipient to go pick up his fax or other such transmitted document. This autodialing and bin receipt massaging concept may also be used for an automatic electronic mail or other printer. Schematically shown in FIG. 6 is a telephone dialer 60 including a message recorder 62 controlled by controller 100. The message recorder 62 may be a simple standard endless loop cassette tape analogue recorder, or (preferably) a digital recording chip, with preprogrammed or microphone input of a short standard message, or other voice "speaker" devices. Automatic dialers are also widely commercially available, and thus, neither it nor the recorder need be further described here. Integral dialing and speaking modules are also available. To accommodate an answering machine answer at the recipient's telephone, a limited number of repeat message replays can be provided, (terminable by a hang-up by the receiving telephone) so as to allow time for the recorded answering message on the receiver's answering machine to play and still receive the unit 10 receipt message on recorder 62. Alternatively, a system of message transmittal which listens and waits for a preset silence period, or for the answering machine's beep tone, before playing the recorded message, can be used.

Instead of, or in addition to, a telephone call indicating receipt in the remote user's job sorter bin of a document from unit 10, an electronic mail note so indicating can be sent to the user's terminal over the network therefor, if unit 10 is connected thereto.

As noted, the entire operation of the exemplary fax sorter unit 10 here may be controlled by an integral conventional low cost microprocessor chip controller 100, conventionally programmable with software, which has ample capability and flexibility for the above functions and also various other functions. For example, the software can be written to address the following special situations:

Note that if every sequential FAX sender used a bin-coded cover sheet as taught herein, then encoding the numbers of sheet in the transmitted document would not be necessary. The next received cover sheet would signal the end of the prior document transmissions (all pages completed). However, for compatibility, the software here accommodates the situation that a coded cover sheet will not be used for many FAX transmissions. So, to ensure sending the entire FAX package (the entire transmitted document-all pages) to a designated bin, encoding, (as indicated) the number of sheets or pages being transmitted is preferably indicated as mandatory in instructions printed on the cover sheet.

Thus, if a marked number indicia for the number of transmitted FAX sheets is not detected on the received copy of the cover sheet [i.e., no readable marking therefor is sensed], then all the received hard copies, including the cover sheet, may be sent to the open or "public" bin, or tray (rather than any locked bin) even if a bin number was encoded and read. [The recipient can still get an automatic phone message informing him or her of this FAX recipient situation, and if desired, a special recorded message indicating the FAX is in the open bin, if a bin number was encoded.]

Also, thus preferably after the total number of sheets indicated by a preceding properly marked cover sheet have all been sent to the designated bin, and are not followed by another properly marked received cover sheet, subsequent received FAX sheets will be sent to a public bin or tray. The recipient may be so informed by a phone message, if a bin number was indicated. However, in this case, alternatively, or optionally, the software can be written to continue to send all subsequent received sheets to the same locked bin if the time lapse between received sheets is within a preset time limit. I.e., the system can assume these sheets are either a follow-up or continuing document for the same recipient, or that the number of sheets encoded on the cover sheet was less than the actual number of sheets in the document sent.

On the other hand, if N number of sheets are coded on the cover sheet, but only N minus X sheets (less sheets than are indicated) are actually faxed, the software can decide that the job send is complete after a preset brief waiting time (a given time limit) has passed. E.g., a few seconds without any further facsimile page receipts. If desired, during this waiting time or pause, the fax machine input can be made "busy" so as not to receive new jobs, by the sorter device controlling the phone line. After this preset brief waiting time, the software will regard the next incoming fax page as the start of a new job. [As noted, a new received coded cover sheet will also signal the end of the prior faxed document.]

One operative example used a modified (as described) commercial Minolta S-10 II ten bin sorter (illustrated herein) operatively associated with an unmodified commercial Xerox Corporation "Telecopier ® 7020" facsimile machine.

The following is an example of simple programmed user interfaces (all with the same, single, simple keypad) which is possible with the disclosed unit. Passwords can be changed at any time desired, except during receipt of a fax transmission. [The machine as shipped can have four-number passwords pre-assigned to the respective bins, e.g., 1111, 2222, 3333, etc.] Passwords are required to be entered to change the existing bin "owner" information, as well as for unlocking any locked bin. The information which can be entered includes the desired new bin password as well as a telephone number to be dialed upon receiving a fax or other printer job for that bin. Whenever the unit is displaying (on the connected LC or other display associated with the keypad) the "Waiting for a sheet . . . Hit any key for menu" prompt, it is ready to change such user information. [Any time it is desired to return to this initial state from a subsequent menu, simply do not press any keys, and after approximately eight to ten seconds the system will automatically return (default) to this initial menu] By pressing any key on the key pad the displayed prompt will change to "Enter Password:". At this point, one may enter a valid, current password. Conventionally, as one types a password, an "*" (asterisk) will appear to show key input has been received. If there is no match found for the entered password, the display will briefly show "Access Denied" and then return to its normal above-indicated awaiting fax sheet input status.

When a correct password has been entered, the next menu will then be displayed, consisting of a choice of "1 Unlock tray" and "2 Change user info". Pressing the number 2 on the keypad then accesses the user information changing menu. The displayed prompt now reads "Change: 1 Password 2 Ph 3 Both". Entering a 1 will allow the password to be changed, entering a 2 will allow a change in the telephone number, and entering a 3 will change both the password and telephone number. If one selects 1 at this point, the menu will now prompt to enter four digits for the new password. Note that the new password will not be displayed as entered. Instead, "* * * " will be displayed, conventionally. The next prompt will ask to verify the new password by entering the same four digits that were entered the first time. If you make the same entry twice, the password will be changed, and the display will briefly notify you of the change. However, if you have failed to enter the same password twice, the display will notify you there was not a match and the password will not be changed.

The method of changing the phone number that is associated with a bin may be accomplished in the same manner as described above, except for choosing "2 Change user info", instead of 1 when prompted for the item to change as described above. The next thing to appear on the display after selecting 2 will be "New phone #". Just the digits as one would dial them are entered. For example, if you would like another local company to be notified when you received a fax, you would enter that company's local telephone number, e.g., 2549100 only, with no hyphens and only seven digits (no area codes). There is no need to press an "enter" key, because after the seventh number is entered the number can be automatically saved. If an error is made while entering the new number, do not press any more keys. After the above-indicated eight to ten second wait for no further key activity, the system will time out, "Canceled" will briefly be displayed and that data entry will be discarded. If the new phone number is recorded, the system will display "Saved" briefly, and then return to the ready state.

The procedure for changing both the password and telephone numbers is exactly as above. After changing your password, instead of returning to the main menu, one will be taken automatically through the above-described change phone number prompts.

The initially assigned four number passwords can be changed by following the steps indicated in the menu. In a control software, an old password can be replaced by a new password and the software matches the password entered by a user with the one saved in the memory for that bin. Matching of the two passwords prompts a locking mechanism to unlock the specific bin. Different passwords are needed for different bins. A locking means, such as the one 50 to be described, can allow several bins be opened one by one after entering their passwords respectively. In the control software, a password is entered to a specific bin number, which, in this example, is related to a specific distance that a moving gate unlocking means such as belt notch 58 will travel from a home position to reach the bin latch 54 location by stepper motor or servo motor controlled movement of the belt 56.

An alternative system of changing passwords or bin assignments is to use the cover sheet 12, rather than a keypad. A pre-arranged, specially marked (abnormal) code pattern on the cover sheet can be read by the controller to tell it to read other subsequent marks on the same or a subsequent cover sheet 12 so as to enter that information into memory as a new password or bin assignment, rather than be normally read as a job bin sorting cover sheet.

An example of a user interface for unlocking bins will now be described. [As noted, bin one is the unlocked public bin, where fax mail that lacks coding is directed, and access is allowed by anyone to this bin.] For unlocking any locked bin, the user can press any key on the keypad 102 while the sorter unit is in the ready mode. One will then be prompted on display 104 to enter the password. Then, simply enter the four number password associated (by pre-programming as indicated above) with the bin one desires to unlock. Incorrect password entry will cause the sorter to display "Access denied" and return to the ready state. If the password entered is legitimate, the menu will then be displayed "1 Unlock tray 2 Change user info". Choose a 1 on the keypad. The display will then show "Unlocking tray" and the number of the tray currently unlocked. The lower line of the display 104 will now contain the statement "Hold key until done". By holding down any key at this point, the gate for that bin can be held "unlocked" until you have completed removing the fax mail from that bin and released the key. The system automatically re-locks and returns to the ready state approximately eight to ten seconds after the key is released.

As noted, another example of an electrical locking and bin unlocking system is described in the above-cited EPO published application No. 0 241 273.

Figure 8:
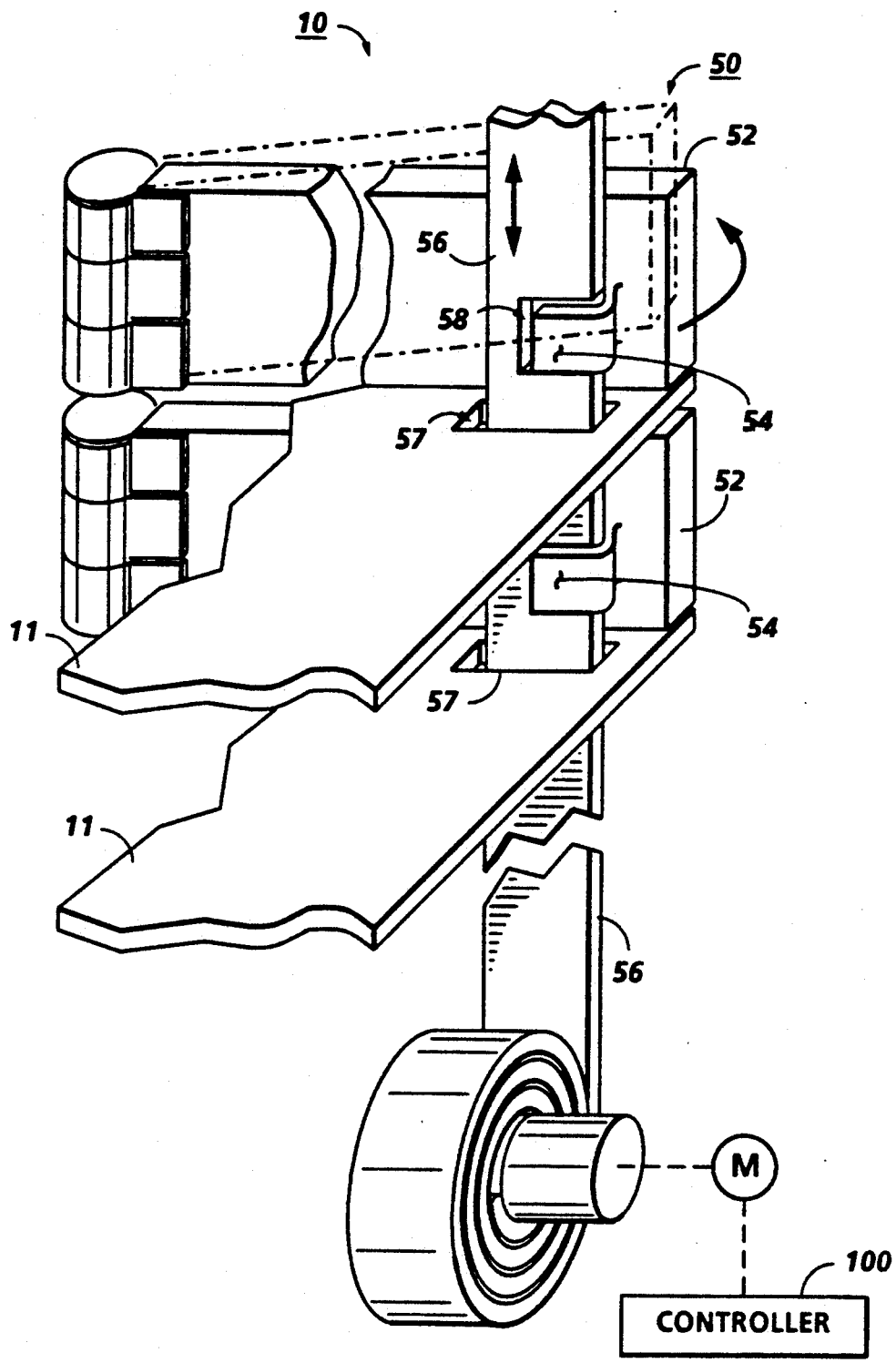
FIG. 8 is a partial, broken-away, enlarged, interior perspective view of one exemplary bin locking and unlocking mechanism usable with the embodiment of FIGS. 1-7.

The following describes one example of a preferred bin locking means 50. Utilizing in a dual-mode function, the paper transport mechanism of a mailbox sorter, an electrical locking means can be linked to the pre-existing moving belt 56 and a control 100 software that governs the delivery of sheets to designated bins. As shown in FIG. 8, a movable flexible timing belt 56 is aligned under the latches 54 of the bin 11 doors 52. Instead of being slideable, these latches 54 here are fixed to the bin doors 52. The belt 56 has a notch 58 on one edge which can be moved up and down to serve as a locking and unlocking means for the door latches 54 of the bins 11. The notch 58 moves with the belt 56, and is positioned at a designated bin location so that the belt does not block that latch 54 of that designated bin 11, so that that particular door 52 can be opened. The other bin doors are held locked by the un-notched areas of the belt 56 retaining all the other door latches 54. The belt 56 is entrained by the bin apertures 57 through which it passes, or other retainers, so that it cannot be pulled out by pulling on any locked door 52. The movement of the notched belt 56 is commanded by the keystroke actions entered in accordance with the password of the electronic lock associated with the bin number. [If desired, a separate key operator accessible mechanical unlocking system for all the bins 11 (as by pivoting open the entire unit 10), can be provided in case of jams or power failures.]

It may be seen that this bin locking and unlocking system 50 requires much less hardware then separate, individual solenoid or cam operated latches for each bin. In fact, there is only one moving part, belt 56, which, as noted, can also be used to provide bin gating for sheet deflection bin selection.

The bin locking system 50 may, is desired, further optionally include lighting indicator lamps on or adjacent the bin door 52 being unlocked, to direct the user to the bin door 52 of the bin 11 to be opened and unloaded, as indicated in FIG. 6. [Note, in this regard, the bin indicator light prior art cited above.]

As noted, the present system is also usable for and applicable to electronic mail hardcopy prints and/or other networked or shared user document printers in general. E.g., in a shared user, networked, printer environment, such as in an office, the printer can electronically recognize the sender or user terminal sending the printing job from network or document electronic information already available in said job. (Such shared printers may also have alternate scanner or floppy disk document inputs.) [It is additionally noted that combined facsimile and digital printing or copying can be provided in one single unit. Note, e.g., Xerox Corporation U.S. Pat. No. 4,947,345 filed Jul. 25, 1989 and issued Aug. 7, 1990 to Paradise, et al.; 3,597,071, filed Aug. 30, 1968 and issued Jul. 27, 1971 to Jones; Fuji Xerox Co. Ltd. U.S. Pat. No. 5,038,218, issued Aug. 6, 1991 to Matsumoto; Sharp U.S. Pat. No. 5,012,892, issued Jun. 4, 1991 to Kita, et al.; and IBM Corp. U.S. Pat. No. 4,623,244, issued Nov. 18, 1986 to D. R. Andrews, et al., originally filed Oct. 4, 1976 (see, e.g., Col. 55). Such plural mode printers are commercially available, e.g., the Fuji Xerox Co. Ltd. "Able" TM machine series (Able TM 3311, etc.) and Canon "Navigator".] Note that existing Xerox Corporation "ViewPoint" TM shared networked printers already automatically print the particular print job sender's name on a self-generated printed job cover sheet, and also electronically notifies the job sender via the network if there is a printing problem. Such pre-existing printer cover sheet generators also print onto each job cover sheet the number of sheets in that job. For the system herein, such printers may be additionally programmed to add (print) a recognizable unique code pattern to the existing job cover sheet printed for that job (from, e.g., a pre-programmed addressee look-up table), which cover sheet, when fed into this same type of "mailbox" sorter unit 10 (or another), can be read to cause the cover sheet and the other subsequent sheets of that job to be directed into a pre-assigned (preprogrammed) mailbox bin for that user or job originator, just as described above for facsimile output. Alternatively or additionally, other printer copy sets may be directed in the same manner to other bins with other printed cover sheet code patterns generated from the electronic job directions sent to the printer by the network user.

For further details of the automatic generation of a readable code pattern onto output sheets from a printer, examples are provided in the above-cited job ticket (job control sheet) printing U.S. Pat. Nos. 4,970,554, 4,757,348, and 4,987,447. The readable code pattern is desirably printed by the regular existing printer image processor which prints the document images on the job sheets output. Alternatively, an on-line extra "annunciator" printer for small areas of the copy sheets in the output path, such as commercially available thermal bar code printers or ink jet printers, may be used.

It will also be appreciated that there are facsimile or other printer system in which the messages or documents are electronically stored rather than printed immediately, and in that case, the designated printer or printers and addressees may be changed or forwarded by an intermediate terminal and/or programmed software, which here can be used to change the bin addresses. Furthermore, the job or cover sheet may contain additional encoded information for other copy or distribution controls.

While the embodiment disclosed herein is preferred, it will be appreciated from this teaching that various alternatives, modifications, variations or improvements therein may be made by those skilled in the art, which are intended to be encompassed by the following claims:

What is claimed is:

1. A system for separating outputted jobs of plural physical sheets from the output of an electronically shared users job printer comprising, but not limited to, a facsimile receiver printer, into separate jobs sets for separate designated recipients of documents jobs electronically transmitted to said printer, comprising:

a variably encoded physical job cover sheet outputted by said printer at said same output in advance of said printer output jobs, said job cover sheet being variably encoded with marked areas indicative of a bin number and a sheet count number for said printer output jobs; and a printer output job sorting and remote recipient notifying accessory unit, said accessory unit including;

sheet input means at said output of said job printer to sequentially receive said sheets of said outputted jobs therefrom and feed them in a sheet feeding path into said sheet input means;

plural discrete job output sheet collection bins;

control means for electronically assigning discrete bin numbers to respective said job output sheet collection bins, and for electronically assigning different said bin numbers to different shared users of said job printer;

optical sensing means in said sheet input means and operatively connecting with said control means for detecting said marked areas encoded on a said job cover sheet and determining if it corresponds to one of said assigned bin numbers;

and sheet bin selection and feeding means, controlled by said determination of said optical sensing means and said control means, for selectively feeding said job sheets from said sheet input means to a designated said output sheet collection bin subsequent to a said determination by said optical sensing means and said control means of said cover sheet with said marked areas encoding corresponding to one of said assigned bin numbers for a said assigned shared user, for said job sorting;

further including automatic telephone dialing means connecting with said control means;

said control means being adapted for inputting and non-volitilely storing preprogrammed telephone numbers electronically assigned to respective said assigned bin numbers;

said automatic telephone dialing means being automatically actuated by said optical sensing means and said control means in response to a said determining of at least one uniquely marked area of a said job cover sheet corresponding to one of said assigned bins numbers when there is at least one said preprogrammed telephone number assigned to that bin number;

said automatic telephone dialing means automatically dialing said preprogrammed telephone number or numbers for said assigned bin number upon said automatic actuation; and further including receipt messaging means for electronically transmitting a pre-recorded message indicating that a said printer output job has been received by said accessory unit, said receipt messaging means being actuated in coordination with said actuation of said automatic telephone dialing means by said control means to automatically transmit said pre-recorded message to said telephone number or numbers preprogrammed for said assigned bin number for said bin into which said job sheets have been fed by said sheet bin selection and feeding means.

2. The printer output job separating system of claim 1, wherein said job sorting accessory unit also has bin locking means for restricting access to individual said bins thereof, and electrical bin unlocking means operatively connecting with said control means for unlocking said locking means for at least one of said bins in response to entry of a bin access code.

3. The printer output job separating system of claim 1, wherein said accessory unit is an independent mailboxing unit not requiring any electronic connection to said job printer to operate therewith.

4. The printer output job separating system of claim 1, wherein said marked areas encoded on said job cover sheet provide for said determination of an assigned bin number and the number of sheets in the job following said job cover sheet to be fed to a said designated bin by said job sorting accessory unit, and said job cover sheet is printed by said printer using optically readable printing indicia used to print said other output job sheets.

5. The printer output job separating system of claim 1, wherein less than five said marked areas encoded on said job cover sheet provides for said detection of said assigned bin number and the number of sheets in the job following said job cover sheet to be fed to a designated bin by said job sorting accessory unit.

6. The printer output job separating system of claim 1, wherein said marked areas encoded on said job cover sheet provides for said determination of an assigned bin number and the number of sheets in the job following said job cover sheet to be fed to a designated bin, and are printed by said printer using optically readable printing indicia used to print said output job sheets, and wherein the number of said job sheets sequentially following a job cover sheet which is fed to one said bin by said sheet bin selection and feeding means corresponds to the number of sheets in the job encoded on the preceding job cover sheet.

7. The printer output job separating system of claim 1, wherein said marked areas on a said job cover sheet are detectable if they are within preset minor plural parallel areas of said sheet feeding path of said sheet input means extending in the feeding direction of a job sheet in said sheet input means, and wherein there are at least two rows of said parallel areas in which said marked areas are detectable, and wherein said optical sensing means and said control means look for dark markings only within minor areas of said two rows spaced along said feeding direction, which spacing is indicated by detectable spacing markers, and wherein a said marked area in one of said two rows is read as a single digit, and wherein a said marked area in the other of said two rows is read therewith as a tens digit so as to provide a number for ten or more job sheets to be fed to a said bin.

8. The printer output job separating system of claim 1, wherein said accessory unit is an independent mailbox unit not requiring any electronic connection to said job printer to operate therewith; and wherein said input means includes sheet side shifting means for lateral movement of said printer output sheets in said feeding path in said input means into a side registered sensing position for said optical sensing means for said detecting of uniquely marked area encoding corresponding to a said bin number.

9. The printer output job separating system of claim 1, wherein said accessory unit further includes locking means for restricting access to individual said bins thereof, with electrical unlocking means including keypad for unlocking an individual said bin in response to entry of a access code preprogrammed on said keypad, and wherein said telephone numbers are also preprogrammed on said same keypad.

10. The printer output job separating system of claim 1, wherein said printer is a commercial facsimile receiver.

11. The printer output job separating system of claim 1, wherein said job cover sheet is a facsimile received copy of an original of a said job cover sheet pre-marked with a said bin number and then electronically transmitted from a remote facsimile transmitting apparatus by a facsimile job sender to a recipient designated by said bin number.

12. The printer output job separating system of claim 1, further including means for feeding said output sheets to an open common output sheet collection bin if no said bin number encoding is so detected.

* * * * *